United States Patent [19]

Arnold

[11] Patent Number: 4,790,947

[45] Date of Patent: Dec. 13, 1988

[54] WATER TREATING IN A VERTICAL SERIES COALESCING FLUME

[76] Inventor: Kenneth E. Arnold, 3031 Shadowdale, Houston, Tex. 77043

[21] Appl. No.: 108,127

[22] Filed: Oct. 13, 1987

Related U.S. Application Data

[62] Division of Ser. No. 735,686, May 20, 1985, Pat. No. 4,720,341.

[51] Int. Cl.⁴ .......................................... B01D 17/028
[52] U.S. Cl. .............................. 210/801; 210/DIG. 5
[58] Field of Search .............................. 210/799–804, 210/300, 255, 262, 265, 301–313, 521, 522, 540, 708, DIG. 5

[56] References Cited

U.S. PATENT DOCUMENTS

| | | | |
|---|---|---|---|
| 748,981 | 1/1904 | Oliver | 210/540 |
| 1,864,511 | 6/1932 | Jones | 210/801 |
| 2,252,959 | 8/1941 | Blair, Jr. | 252/348 |
| 2,698,303 | 12/1954 | Blair, Jr. et al. | 252/349 |
| 2,846,073 | 11/1955 | Hopper | 210/540 |
| 3,032,403 | 5/1962 | Kohl | 210/300 X |
| 3,491,882 | 1/1970 | Elam | 210/799 |
| 3,527,348 | 9/1970 | Lalonde et al. | 210/540 |
| 3,529,728 | 9/1970 | Middelbeek et al. | 210/540 |
| 3,884,815 | 5/1975 | Cornelissen | 210/521 |
| 3,971,719 | 7/1976 | Peters | 210/540 |
| 4,049,553 | 9/1977 | Stebbins et al. | 210/540 |
| 4,139,463 | 2/1979 | Murphy et al. | 210/800 |
| 4,265,759 | 5/1981 | Verpalen | 210/300 X |
| 4,278,545 | 7/1981 | Batutis et al. | 210/DIG. 5 |
| 4,333,835 | 6/1982 | Lynch | 210/320 |
| 4,350,596 | 9/1982 | Kennedy, Jr. | 210/804 X |
| 4,356,086 | 10/1982 | Oberg | 210/242.3 |
| 4,359,329 | 11/1982 | Willeitner | 210/DIG. 5 |
| 4,361,488 | 11/1982 | White et al. | 210/799 X |
| 4,388,357 | 6/1983 | Luebke | 210/170 |
| 4,479,875 | 10/1984 | Nelson | 210/DIG. 5 |
| 4,483,774 | 11/1984 | Brill | 210/540 |
| 4,501,664 | 2/1984 | Heil et al. | 210/220 |
| 4,583,998 | 4/1986 | Reid et al. | 210/801 X |
| 4,599,117 | 7/1986 | Luxemburg | 210/708 X |

OTHER PUBLICATIONS

Arnold, "Design Concepts for Offshore Produced-Water Treating and Disposal Systems," *Jour. of Petroleum Tech.*, Feb., 1983.

Arnold et al., "Designing Oil and Gas Production Systems (I and II)," *World Oil*, Mar., 1985 (pp. 69–78) and May, 1985 (pp. 91–98).

Karabelas, "Droplet Size Spectra Generated in Turbulent Pipe Flow of Dilute Liquid/Liquid Dispersions," *AIchE Journal*, Mar., 1978, pp. 170–179.

Hinze, "Fundamentals of the Hydrodynamic Mechanism of Splitting in Dispersion Processes," *AichE Journal*, Sep. 1985, pp. 289–295.

*Primary Examiner*—Tom Wyse
*Attorney, Agent, or Firm*—Paul F. Simpson

[57] ABSTRACT

A method and apparatus for removing oil from the produced water that is associated with hydrocarbons. The method consists of providing a plurality of serially connected individual compartments in a vertical flume or pipe with each compartment connected to the next compartment by a flow path that induces the oil droplets to coalesce.

4 Claims, 8 Drawing Sheets

FIG. 1

PLAN

WATER TREATING IN A VERTICAL SERIES COALESCING FLUME

This is a divisional application of co-pending application Ser. No. 735,686, filed May 20, 1985, now U.S. Pat. No. 4,720,341.

BACKGROUND OF THE INVENTION

The present invitation relates to the removal of an immiscible fluid in a water continuous phase. In particular, the invention relates to the cleanup of hydrocarbons in water that is produced with crude oil before the water is discharged to a disposal area or to an injection well. Attempts to remove oil from the water by providing retention time with large tanks or flumes have not been successful. Tanks or flumes with theoretical retention times large enough to accomplish removal of small oil droplets dispersed in the oil continuous phase are subject to severe short circuiting due to temperature and density difference.

In U.S. Pat. No. 3,893,918 issued July 8, 1975 there are disclosed skim piles or elongated separator conduits that are useful in such operations. In that design there is a plurality of closely spaced baffle plates to induce coalescence of droplets of oil in the water. With each passing of a baffle some of the coalesced oil droplets rise to a quiescent zone on the underside of the previous baffle where they are recovered and transported to the top of the conduit.

The present invention utilizes a plurality of coalescing pipes instead of baffles to create the turbulence between each section of the vertical flume. The retention time of the water while flowing through these pipes is much greater than the retention time of the water while flowing around the edge of a baffle. Since coalescence is known to be a time dependent phenomena, flow through the coalescing pipe is significantly more efficient at increasing the diameter of the oil droplets to be separated from the water and thus fewer stages of separation are required than in the previous patent.

The coalescing pipes also cause abrasion of sand or solid particles with each other and with the pipe walls. This cleans the solids of oil attached to them with each passage through the coalescing pipes. The oil drops which are abraded from the solids become dispersed in the water where they coalesce and are separated out in a treating zone.

The length and diameter of the coalescing pipes can be determined to provide appropriate drop size growth. In the baffle design of the previous patent it is not possible to predict ahead of time the degree of drop size growth that will occur as the water flows round the edge of each baffle. Thus, the present invention is an improvement on the existing patent by providing for better coalescence per stage and thus requiring fewer stages to treat the water. In addition, the amount of abrasion which is experienced by solid particles is increased, making for an improvement in treating oil from the solids contained in the water. Finally, the process follows defined physical and empirical laws which allows the engineer to size the installation with a high degree of comfort that it will function in the required manner.

BRIEF SUMMARY OF THE INVENTION

The present invention provides for series treating of oil from water so that the oil content of the water in the final stages is low enough to allow the water to be injected into a geological formation or discharged into the surrounding waters. The invention comprises a vertical flume which could be a pipe or a flume of any other cross-sectional shape. The flume is divided horizontally into separate compartments so that oil can be removed from the water in various stages. The water flows vertically downward from one compartment to another. In each compartment sufficient time is provided and the water velocity is controlled so that some of the larger oil droplets dispersed in the water can rise countercurrent to the water flow and accumulate at the top of each compartment. A flow path is provided so that the oil trapped at the top of each compartment is transported to the oil pad at the top of the previous compartment.

In flowing down from one compartment to the next in sequence the fluid flows through a series of pipes or other tortuous path which provides sufficient turbulence and retention time to increase the size of the oil drops in the water. Because of the geometry of flow, the difference in specific gravity of the oil and water, and the viscosity of water, there is a calculable minimum drop size which can be removed in each settling section. By increasing the size of the remaining droplets as the water flows from one settling section to the other, additional oil can be removed from the water in each settling section.

BRIEF DESCRIPTION OF THE DRAWINGS

The present invention will be more easily understood from the following description when taken in conjunction with the attached drawings in which.

DESCRIPTION OF PREFERRED EMBODIMENTS

The present invention can be applied to any vertical elongated flume which can be subdivided into separate compartments. The water enters the flume at the top of the first compartment. The produced water entering the flume has a certain concentration of oil suspended in it in droplets of varying diameters. The droplet size distribution can be characterized by a Rosin-Rammlir distribution FIG. 8, or some other similar distribution. It has been shown that the time it takes for a droplet to grow in size due to coalescence in a deep bed gravity settler where there is little energy input is very long. Therefore very little coalescence will take place in any one settling section of the flume.

From Stoke's Law it is possible to calculate the minimum size oil droplet which will rise at sufficient velocity in the settling section to overcome the downward velocity of the water in the flume. This is given by:

$$V_t = \frac{1.78 \times 10^{-6}(\Delta SG)d_m^2}{\mu}$$

where:
- $V_t$ = droplet terminal rise velocity, fps
- $\Delta SG$ = Difference in specific gravity (water=1) between the oil and water.
- $d_m$ = droplet diameter, micron
- $\mu$ = viscosity, cp A similar equation can be derived for flumes of other cross-section shapes by calculating the water velocity in feet per second, setting it equal to $V_t$ and solving for $d_m$.

Figure 8:
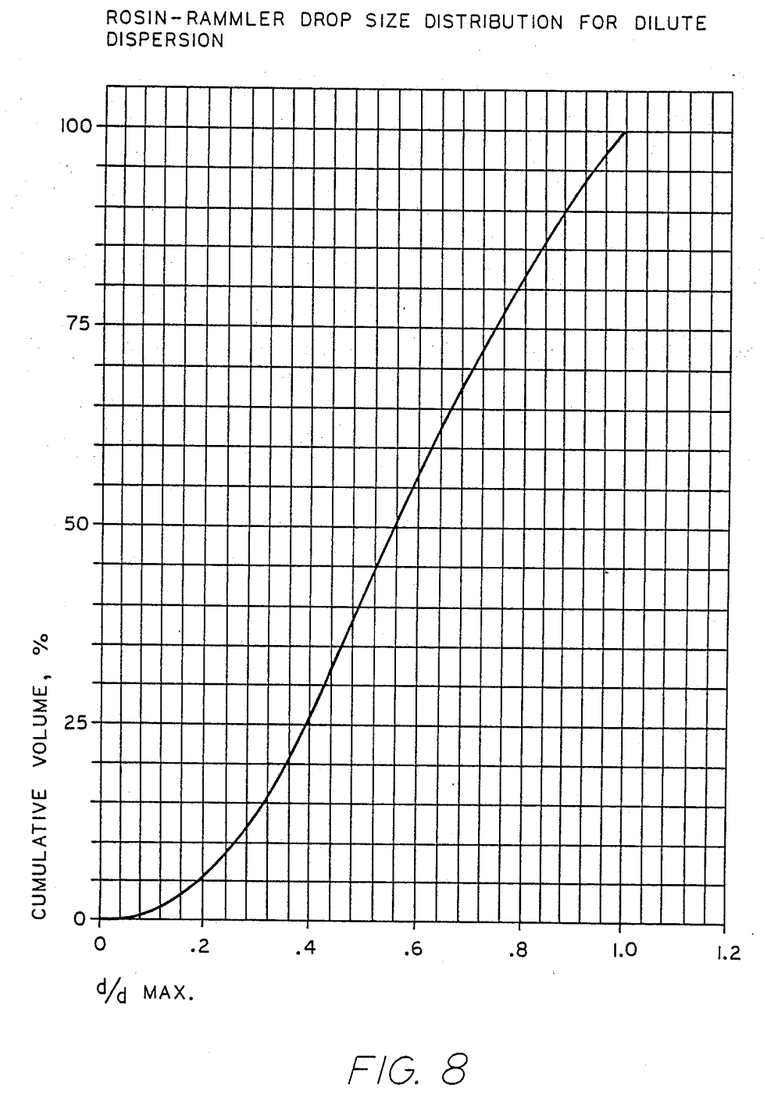
FIG. 8 shows a graph of a Rosin-Rammlir distribution of diameter sizes of suspended oil droplets in produced water.

It can be seen from FIG. 8 that a certain percent of the volume of oil in the water can be captured in each settling chamber if $d_{max}$ is known in the water entering the chamber and the minimum diameter of droplet which can be settled out in the chamber has been calculated by Stokes's Law.

The flow between each settling section is by means of a tortuous path or coalescing pipes. It has been shown that given sufficient time, the turbulence in such flow will aid in coalescence until a new size distribution is reached which is given by:

$$d_{max} = 0.725 \frac{1}{\epsilon^{2/5}} \left[ \frac{\sigma}{\rho_w} \right]^{3/5} \times 10^4$$

where:
- $\epsilon$ = mixing parameter, cm$^2$/s$^3$
- $\sigma$ = surface tension, dyne/cm
- $\rho_w$ = density, g/cm$^3$ The time required to develop this new drop size distribution has been determined experimentally to be on the order of 300 pipe diameters.

Thus, by properly sizing the path between settling sections to create the proper combination of mixing parameter and retention time, it is possible to cause coalescence to a droplet size distribution which will cause a specified percentage of the volume of oil remaining in the water to be separated out in the next succeeding settling section. By flowing the water in such a manner through several settling and coalescing sections in series any degree of overall oil removal efficiency can be obtaining approaching, but not equal to, 100 percent.

Figure 1:
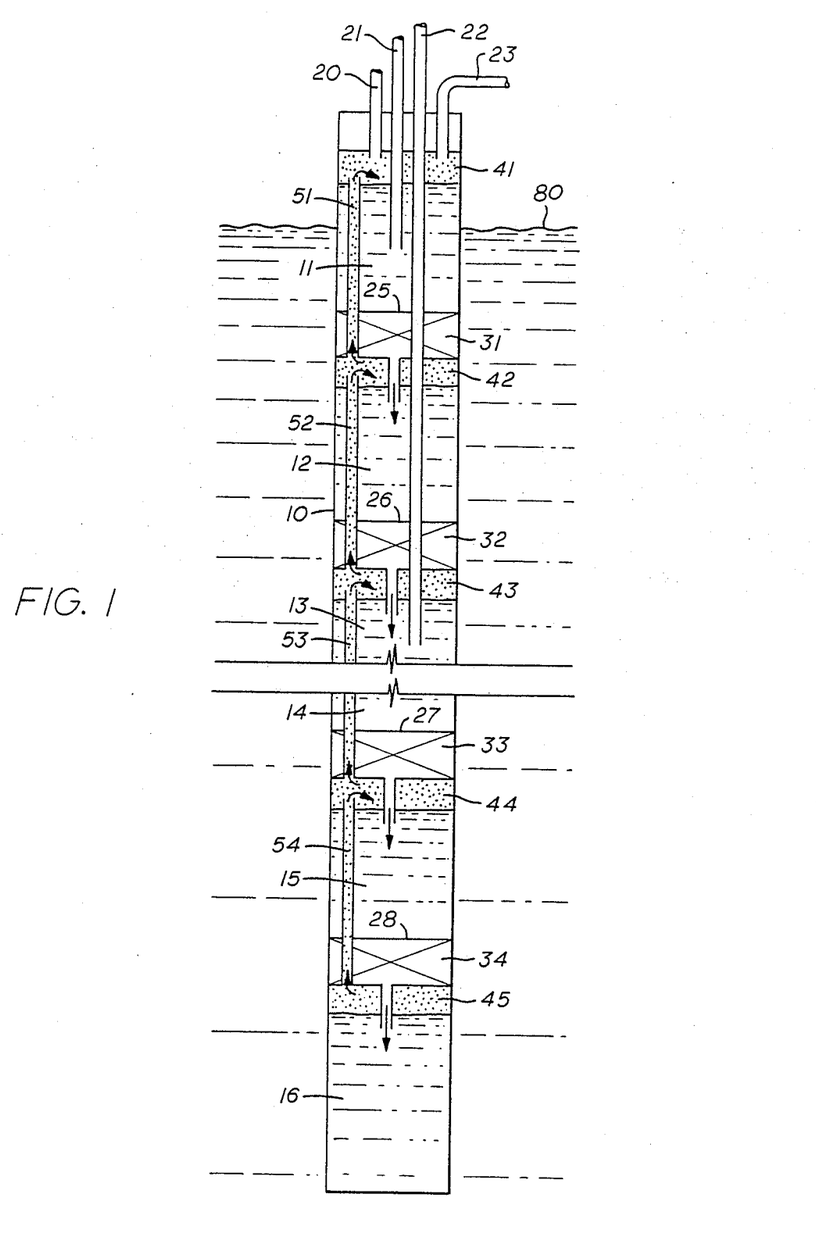
FIG. 1 is a longitudinal cross section of the vertical flume incorporating the present invention.

Referring to FIG. 1, the flume 10 is divided into several settling compartments 11, 12, 13, 14 and 15 by a series of bulkheads 25, 26, 27 and 28. The water can flow into the flume through one or more inlets 20, 21, and 22. Inlet type 20 communicates with the first settling compartment in or above the oil section and would be used for a stream containing mostly oil. Inlet type 21 communicates with the water section of the first settling compartment and would typically be used for a stream containing mostly water. Inlet type 22 injects the water below some or all of the settling sections and would typically be used for a relatively clean stream which can be kept separate from the type 20 and 21 streams which may require more treating.

The oil which separates from the water in compartment 11 rises to the surface and forms an oil pad 41. This oil can flow or be pumped out of the flume 10 through pipe 23. For a flume which is open on bottom to a surrounding body of water 80 the thickness of the oil pad can be maintained by sensing the top of the oil layer, sensing the oil water interface, or by pumping the oil out on a regulated time cycle. Various instruments, pumps and blowcase configurations have been widely used in industry to perform the function of skimming or pumping oil from a tank.

Figure 4:
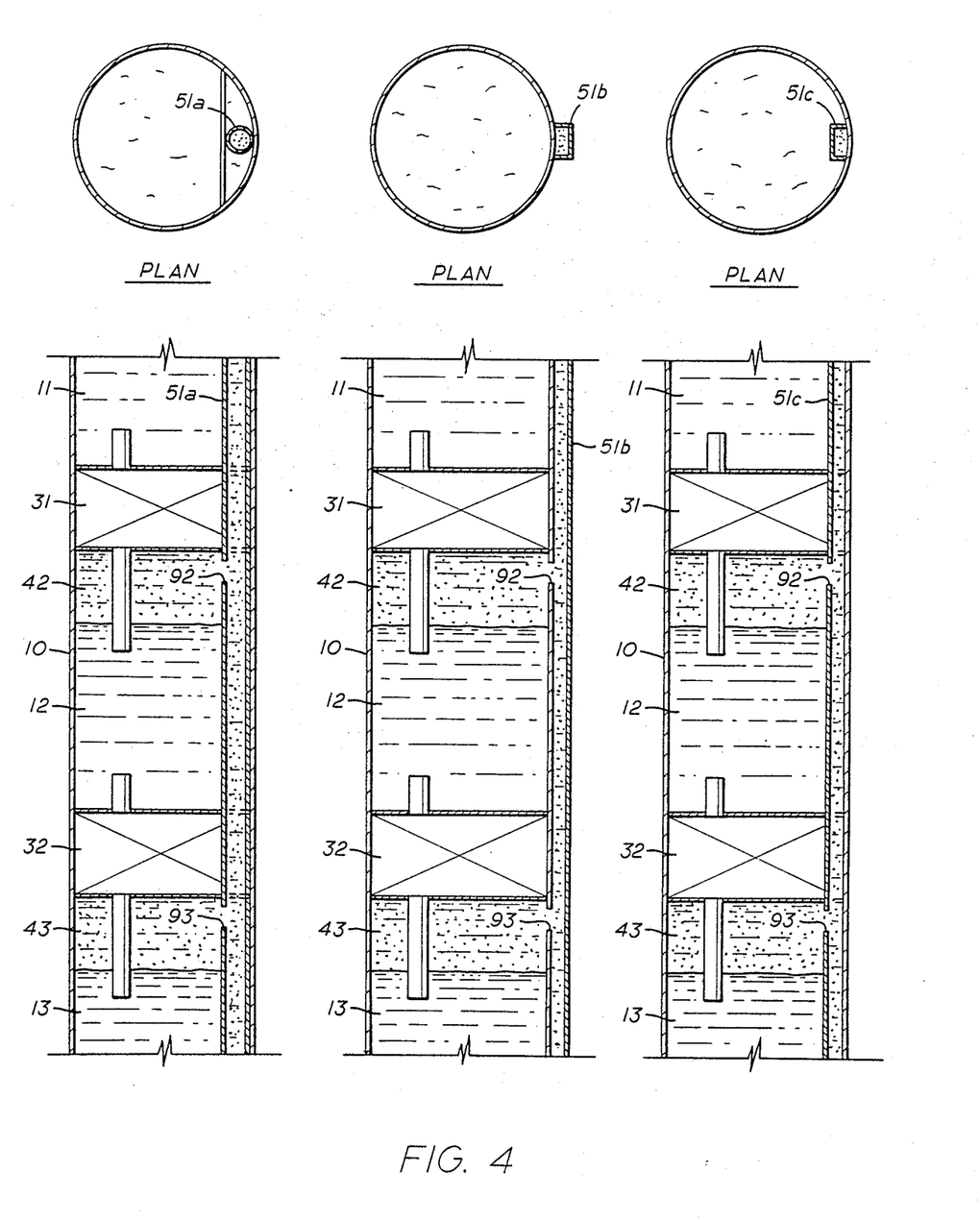
FIG. 4 shows details of several riser means which can be utilized to transport the oil vertically upward from one oil pad to the next in sequence.
Figure 4A:
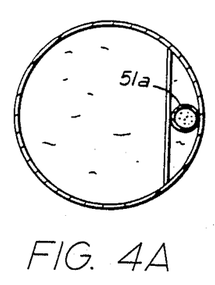
Figure 4B:
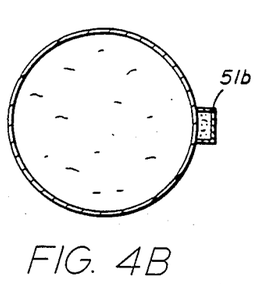
Figure 4C:
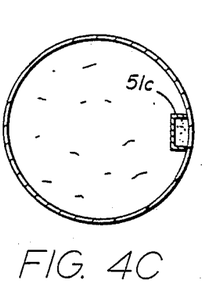
Figure 4D:
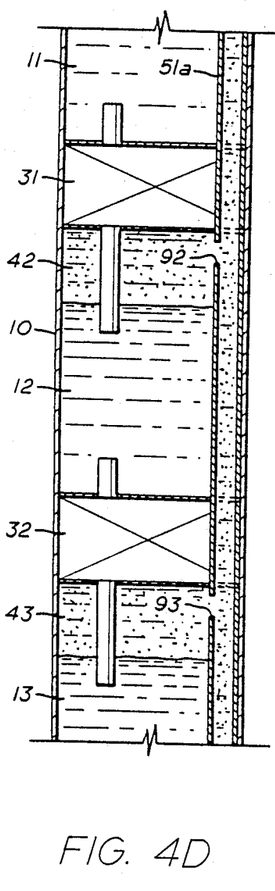
Figure 4E:
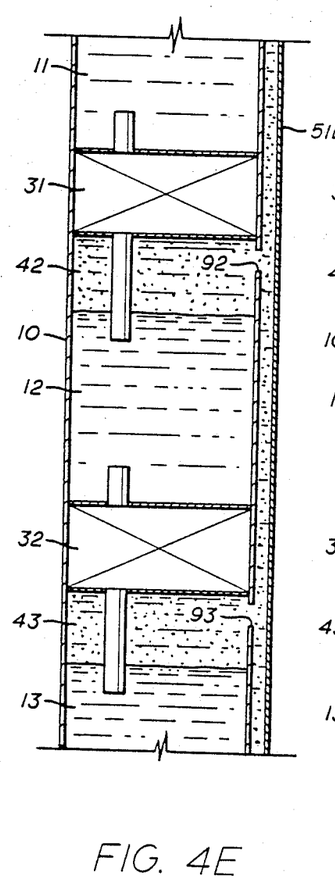
Figure 4F:
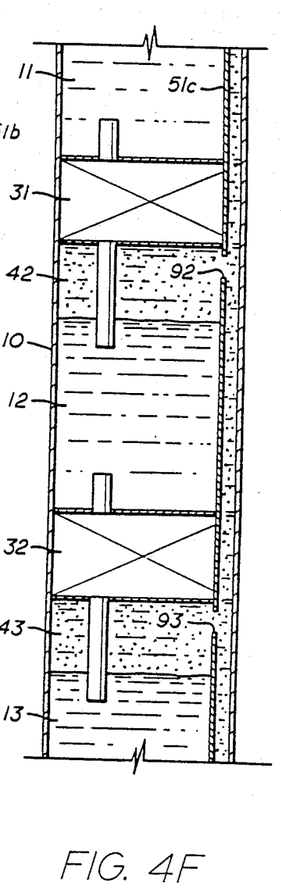

The water containing droplets of oil too small to rise countercurrent to the water flow proceeds downward through compartment 11 to bulkhead 25. At this point it enters a coalescing pack 31 which is sized for sufficient turbulence and retention time to "grow" a larger drop size distribution. The water exits the coalescing pack below the oil/water interface of settling compartment 12 and continues to flow downward through this compartment to bulkhead 26. Oil droplets in this water which are of sufficient diameter to have a rise velocity greater than the downward water velocity flow countercurrent to the water to the underside of bulkhead 25 where an oil pad 42 is formed. This captured oil rises through an internal pipe 51 to the oil pad 41 in compartment 11. Alternatively the oil captured in oil pad 42 can rise through a pipe 51a or channel 51b, 51c external or internal to the flume 10 as shown in FIG. 4.

The water containing oil droplets too small to rise countercurrent to the water flow continues downward through compartment 12 to bulkhead 26 where the process of coalescence in coalescing pack 32, droplet separation in settling compartment 13, oil capture in oil pad 43, and oil rising through internal pipe 52 begins again. This process continues section by section until the desired water quality is obtained.

Figure 2:
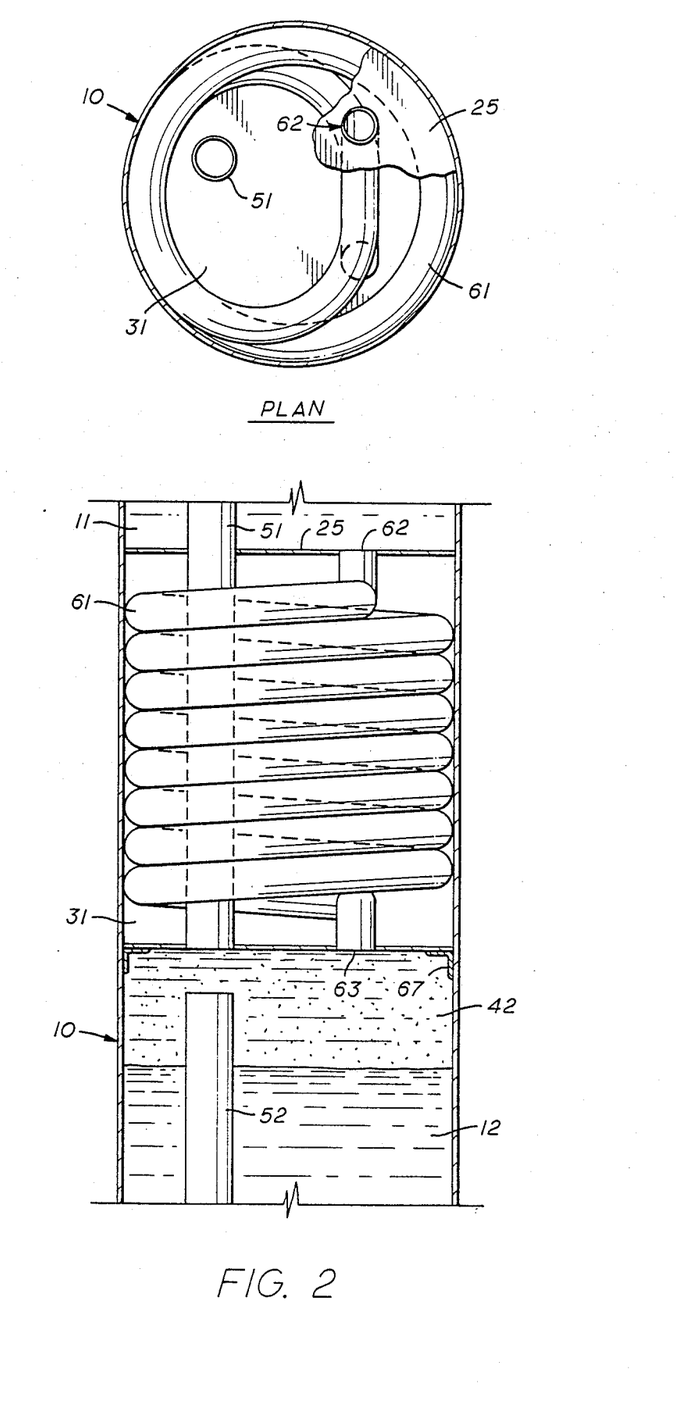
FIG. 2 is a plan and elevation of a spiral pipe used to create coalescence between settling compartments.
Figure 2A:
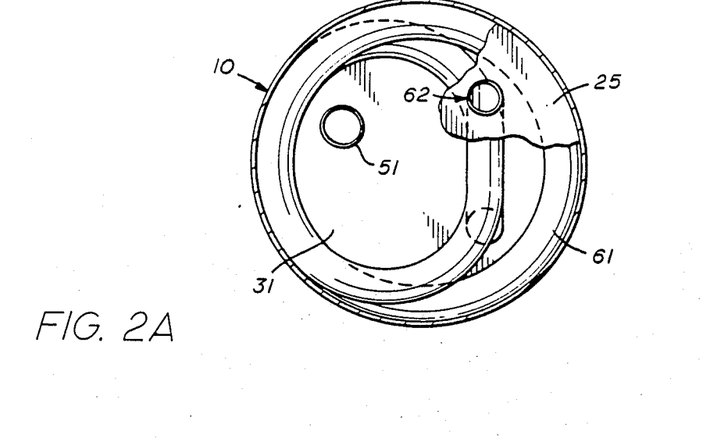
Figure 2B:
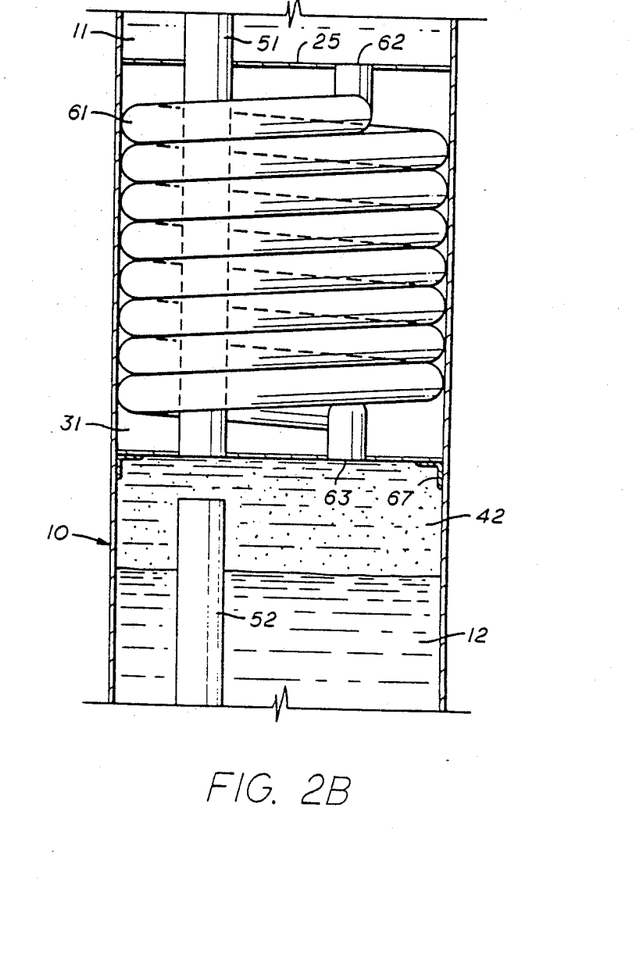
Figure 3A:
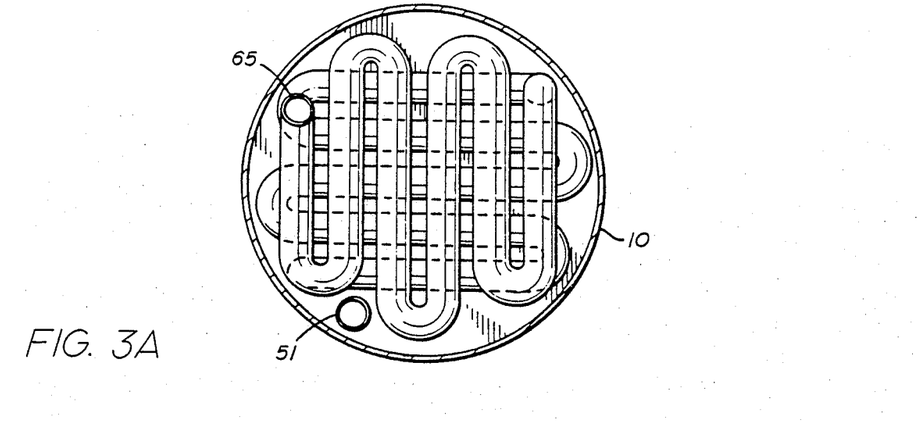
FIG. 3 is a plan and elevation of an example tortuous path used to create coalescence between settling compartments.
Figure 3B:
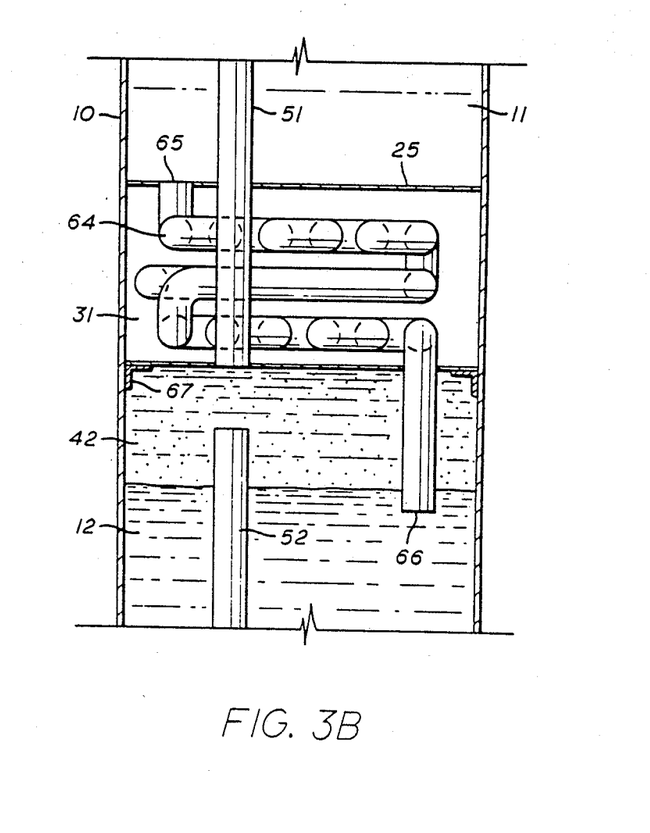

Referring to FIGS. 2 and 3, there are shown two alternative means of creating the desired oil drop size coalescence. In FIG. 2 the coalescence occurs in a pack of spiral pipe 61 of required length and diameter. The inlet of the pipe 62 is shown to be in the center of the flume but it can be at any position in the plan area of the flume. The outlet of the pipe 63 is shown to be pointing downward at the center of the flume. However it could just as easily discharge in a horizontal direction to create a centrifugal flow and aid in oil droplet separation. If no solids were expected in the water flow the outlet could be pointed upward to give the water an initial upward velocity and thus aid in oil droplet separation. The pack can be permanently installed in the flume or it could be attached to ring 67 in such a manner that it can be removed from above for maintenance. Packs located at lower elevations in the flume will be of successively smaller diameter to allow them to be removed through the overhead rings.

In FIG. 3, coalescence is created by flowing through a horizontal maze 64 which fits into the flume. The flow path through the maze could be either circular or rectangular in cross-section. The inlet 65 and outlet 66 of the maze could be oriented in various configurations as described above for the spiral pipe 61. These packs could also be removable as described above.

The treated water leaves the last section of the flume and proceeds either directly into a surrounding body of water, or back to the process for further treating or disposal.

Figure 5:
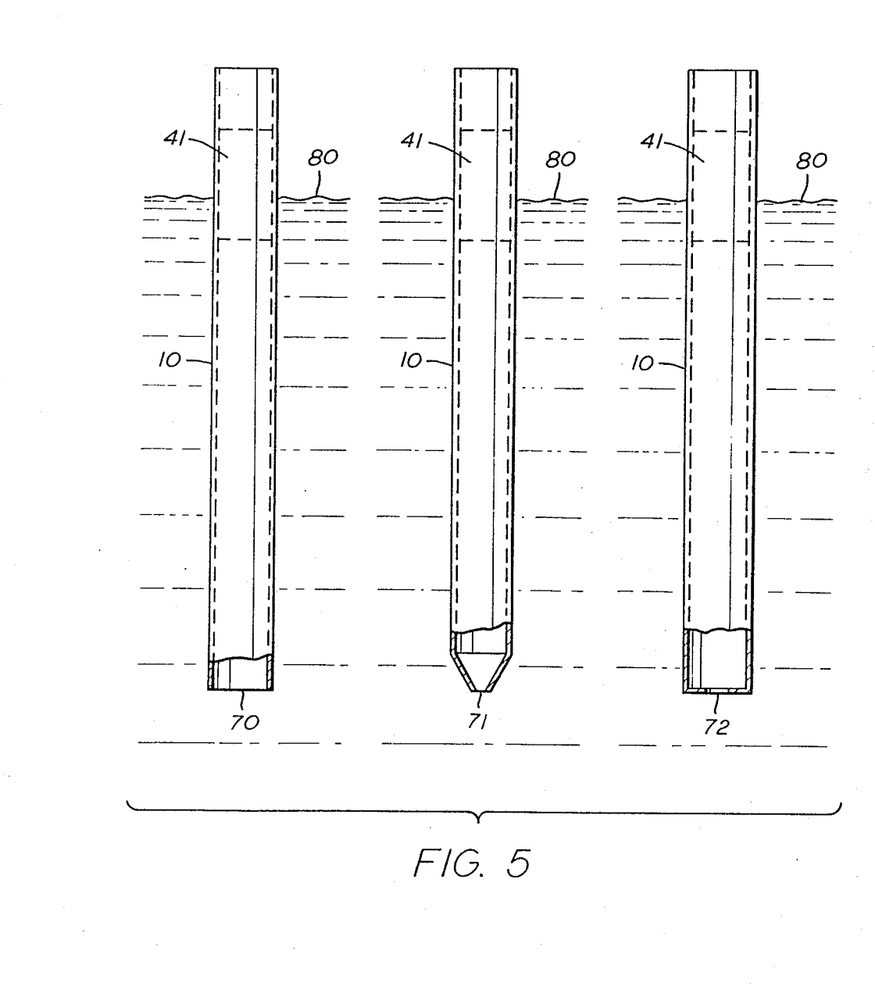
FIGS. 5, 6 and 7 show several of the schemes which can be used to control flow of water from the flume.

Referring to FIG. 5 if the flume is surrounded by a water body 80 as in the case of a flume immersed in the ocean, the treated water may flow out of the tip. The tip can be the same dimensions as the flume, 70 or it could be an orifice of conical shape, 71 or an orifice of any other shape, 72.

The level of liquid in the flume would be established by the difference in specific gravity of the water in the flume and that in the body of water, the pressure drop through the coalescing packs and the thickness of the oil pad, 41, in the top of the flume.

Figure 6:
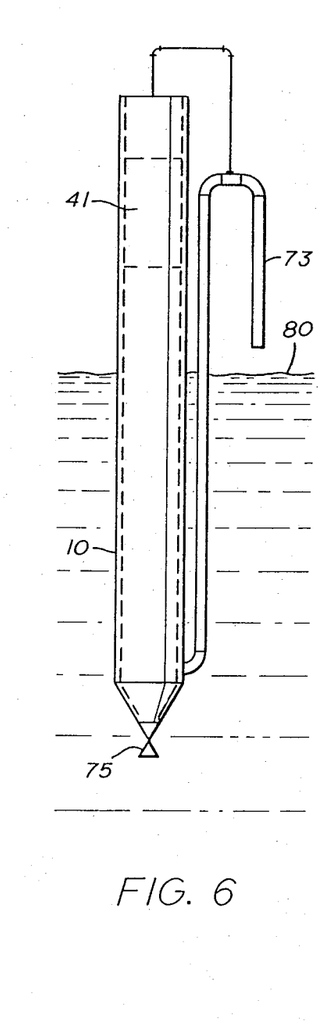
Figure 7:
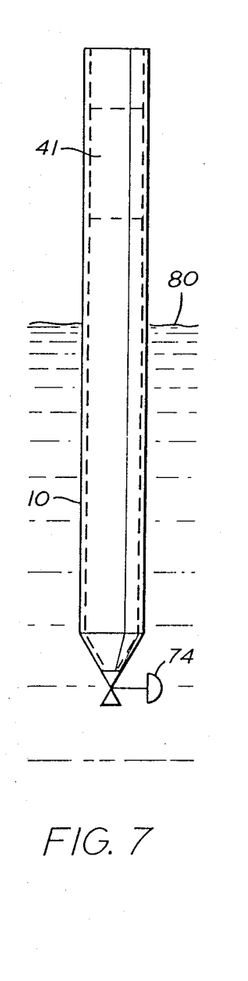

Referring to FIGS. 6 and 7, if the flume is located totally or partially above the surface of any surrounding water it will be necessary to use a water leg 73, or water dump valve 74 to maintain a constant liquid level in the flume. The liquid dump valve 74 may or may not be submerged in a surrounding water body 80. The level of liquid in the flume and thickness of the oil pad 41 could be determined by any of the numerous sensing and control techniques normally used in oil/water separators. If a water leg 73 is used it may be necessary to include an automatic or manual drain valve 75 to keep solids from building up in the vessel.

What is claimed is:

1. A method for separating oil from a mixture of oil and water, comprising the steps of:
    introducing such mixture into a series of vertically disposed compartments having bulkhead means disposed between each pair of said compartments, the bulkhead means defining an upper compartment and a lower compartment and blocking flow therebetween;
    flowing such mixture from the upper compartment to the lower compartment through a conduit having a flow bore and at a flow velocity sufficient to induce turbulence in such a mixture for such time as necessary to coalesce droplets of such oil;
    separating oil from such mixture within the lower compartment;
    flowing the separated oil from an upper region of the lower compartment with a riser means;
    receiving the separated oil from the riser means with a removal means;
    discharging all the separated oil from the series of compartments with the removal means; and
    discharging fluid from the lowermost compartment of the series.
2. The method of claim 1 wherein the conduit is configured as a maze.
3. The method of claim 2 wherein the maze includes a level of conduit disposed substantially on a single plane and having a plurality of alternating conduit bends with a straight conduit section disposed between each adjacent pair of such conduit bends.
4. The method of claim 3 wherein the maze includes a plurality of such levels of conduit.

* * * * *